United States Patent
Sato et al.

(10) Patent No.: US 8,580,914 B2
(45) Date of Patent: Nov. 12, 2013

(54) PROCESS FOR PRODUCING ALIPHATIC POLYESTER

(75) Inventors: Hiroyuki Sato, Fukushima-Ken (JP); Yoshinori Suzuki, Fukushima-Ken (JP); Tomohiro Hoshi, Fukushima-Ken (JP); Fumio Maeda, Fukushima-Ken (JP)

(73) Assignee: Kureha Corporation, Tokyo (JP)

( * ) Notice: Subject to any disclaimer, the term of this patent is extended or adjusted under 35 U.S.C. 154(b) by 462 days.

(21) Appl. No.: 12/223,285

(22) PCT Filed: Jan. 29, 2007

(86) PCT No.: PCT/JP2007/051401
§ 371 (c)(1),
(2), (4) Date: Aug. 20, 2009

(87) PCT Pub. No.: WO2007/086563
PCT Pub. Date: Aug. 2, 2007

(65) Prior Publication Data
US 2010/0234557 A1    Sep. 16, 2010

(30) Foreign Application Priority Data
Jan. 30, 2006   (JP) ................. 2006-020404

(51) Int. Cl.
*C08G 63/08* (2006.01)
(52) U.S. Cl.
USPC ........................................ 528/354; 528/480
(58) Field of Classification Search
USPC ................................ 528/272, 354
See application file for complete search history.

(56) References Cited

U.S. PATENT DOCUMENTS

| 7,538,178 B2 * | 5/2009 | Sato et al. ...................... 528/272 |
| 2003/0013821 A1 * | 1/2003 | Tan et al. ...................... 525/413 |
| 2005/0169817 A1 | 8/2005 | Matsuo |

FOREIGN PATENT DOCUMENTS

| JP | 10-060101 | * | 3/1998 |
| JP | 10-168171 | | 6/1998 |
| JP | 11-279267 | | 10/1999 |
| JP | 11-349670 | | 12/1999 |
| JP | 2005-220203 | | 8/2005 |
| JP | 2005-220242 | | 8/2005 |
| WO | 2004/033527 | | 4/2004 |

OTHER PUBLICATIONS

P.A. Fleury "Turning liquid into solids", Worlwide Process, Apr. 2001.*
Rosato "A practical processing handbook" Chapter 1 and 6, 1998.*
Supplementary European Search Report (in English language) issued Oct. 24, 2011 in corresponding European Patent Application No. 07 70 7632.

* cited by examiner

*Primary Examiner* — Ling Choi
*Assistant Examiner* — Gennadiy Mesh
(74) *Attorney, Agent, or Firm* — Wenderoth, Lind & Ponack, L.L.P.

(57) ABSTRACT

A process for producing an aliphatic polyester through ring-opening polymerization of a cyclic ester, wherein a partial polymer in a molten state is continuously introduced into a twin-screw stirring device to continuously obtain a partial polymer in a solid pulverized state, the partial polymer is subjected to solid-phase polymerization, and the resultant polymer is melt-kneaded together with a thermal stabilizer to be formed into pellets. As a result, an aliphatic polyester of a high molecular weight and with little discoloration is produced efficiently.

10 Claims, 2 Drawing Sheets

PROCESS FOR PRODUCING ALIPHATIC POLYESTER

This application is the national stage of International Application No. PCT/JP2007/051401, filed Jan. 29, 2007, which claims priority to Japanese Application No. 2006-020404, filed Jan. 30, 2006.

TECHNICAL FIELD

The present invention relates to an improvement in process for producing an aliphatic polyester by ring-opening polymerization of a cyclic ester, such as glycolide.

BACKGROUND ART

Aliphatic polyesters, such as polyglycolic acid and polylactic acid, can be decomposed by microorganisms or enzymes present in nature, such as soil or sea water, so that they are noted as biodegradable polymer materials giving little load to the environment.

Among the aliphatic polyesters, polyglycolic acid is excellent in gas-barrier properties, such as oxygen gas-barrier property, carbon dioxide gas-barrier property and water vapor-barrier property and also excellent in heat resistance and mechanical properties, and therefore the development of new use thereof is under way singly or in a composite state together with another resin material in the fields of packaging materials, etc.

An aliphatic polyester can be synthesized by dehydropolycondensation of an α-hydroxycarboxylic acid, such as glycolic acid or lactic acid, while it is difficult to produce a high-molecular weight aliphatic polyester through this process. In contrast thereto, in order to effectively synthesize an aliphatic polyester of a high molecular weight, there has been adopted a process of synthesizing a bimolecular cyclic ester of an α-hydroxycarboxylic acid and subjecting the cyclic ester to ring-opening polymerization. For example, by ring-opening polymerization of glycolide that is a bimolecular cyclic ester of glycolic acid, polyglycolic acid is obtained. By ring-opening polymerization of lactide that is a bimolecular cyclic ester of lactic acid, polylactic acid is obtained.

The polymerization process for producing an aliphatic polyester by ring-opening polymerization of a cyclic ester is generally performed in the form of melt-polymerization where all the steps are operated above the melting point of the product aliphatic polyester, and the present inventors, et. al., have proposed a process wherein a latter half step of the ring-opening polymerization of cyclic ester is performed in a reactor of relatively thin tubes to effect solid-phase polymerization (Patent Document 1 listed below). This process is, however, a batch-wise polymerization process using relatively thin tubes, and a process allowing easier mass production is desired. Further, the polymerizate recovered in the form of solid lumps requires a granulating step, such as pulverization.

There has been proposed a process of condensation-polymerizing lactic acid in a twin-screw stirring apparatus including a former half of melt polymerization and a latter half of solid polymerization, so as to enhance the efficiency of removing generated water and recover the product lactic acid polymer in a pulverized form (Patent Document 2 below). As already mentioned, however, it is difficult to obtain a high-molecular weight aliphatic polyester by poly-condensation of an α-hydroxy-carboxylic acid, such as lactic acid, like this process. Further, this process is essentially a batch-wise process and cannot be regarded as an entirely efficient process for producing an aliphatic polyester.

In contrast thereto, processes of ring-opening polymerization of a cyclic ester in a twin-screw extruder suitable for a high-viscosity polymerizate (Patent Document 3 below) and in a tubular reactor (Patent Document 4 below), have been proposed as continuous processes for producing aliphatic polyesters. However, while an aliphatic polyester is excellent in biodegradability on one hand, the thermal degradability and discoloration under heating thereof cannot be disregarded, so that it is difficult to obtain an aliphatic polyester of a high-molecular weight and with little discoloration.

Patent Document 1: WO 03/006526A1
Patent Document 2: JP 11-279267A
Patent Document 3: JP7-126358A
Patent Document 4: JP10-60101A

DISCLOSURE OF INVENTION

Accordingly, a principal object of the present invention is to provide an efficient process for producing an aliphatic polyester of a high molecular weight and with little discoloration.

As a result of study with the above-mentioned object, the present inventors have arrived at a conclusion that in order to produce an aliphatic polyester of a high-molecular weight and with little discoloration, it is inappropriate to perform a whole process of ring-opening polymerization of a cyclic ester in a molten state. As a result, a knowledge is obtained that a latter half of the polymerization is performed as solid-phase polymerization to finally produce a pellet-form aliphatic polyester suitable as a forming material through melt-kneading with a thermal stabilizer, and a solid pulverizate of a partial polymer is obtained prior to solid-phase polymerization, whereby it becomes easy to perform melt-kneading with the thermal stabilizer after the solid-phase polymerization. Further, also a knowledge is obtained that in order to obtain the solid pulverizate of partial polymer, it is optimum to use a twin-screw stirring device.

The process for producing an aliphatic polyester is based on the above-mentioned knowledge and more specifically comprises: ring-opening polymerization of a cyclic ester to produce the aliphatic polyester, wherein a partial polymer in a molten state is continuously introduced into a twin-screw stirring device to continuously obtain a partial polymer in a solid pulverized state, the partial polymer is subjected to solid-phase polymerization, and the resultant polymer is melt-kneaded together with a thermal stabilizer to be formed into pellets.

Figure 1:
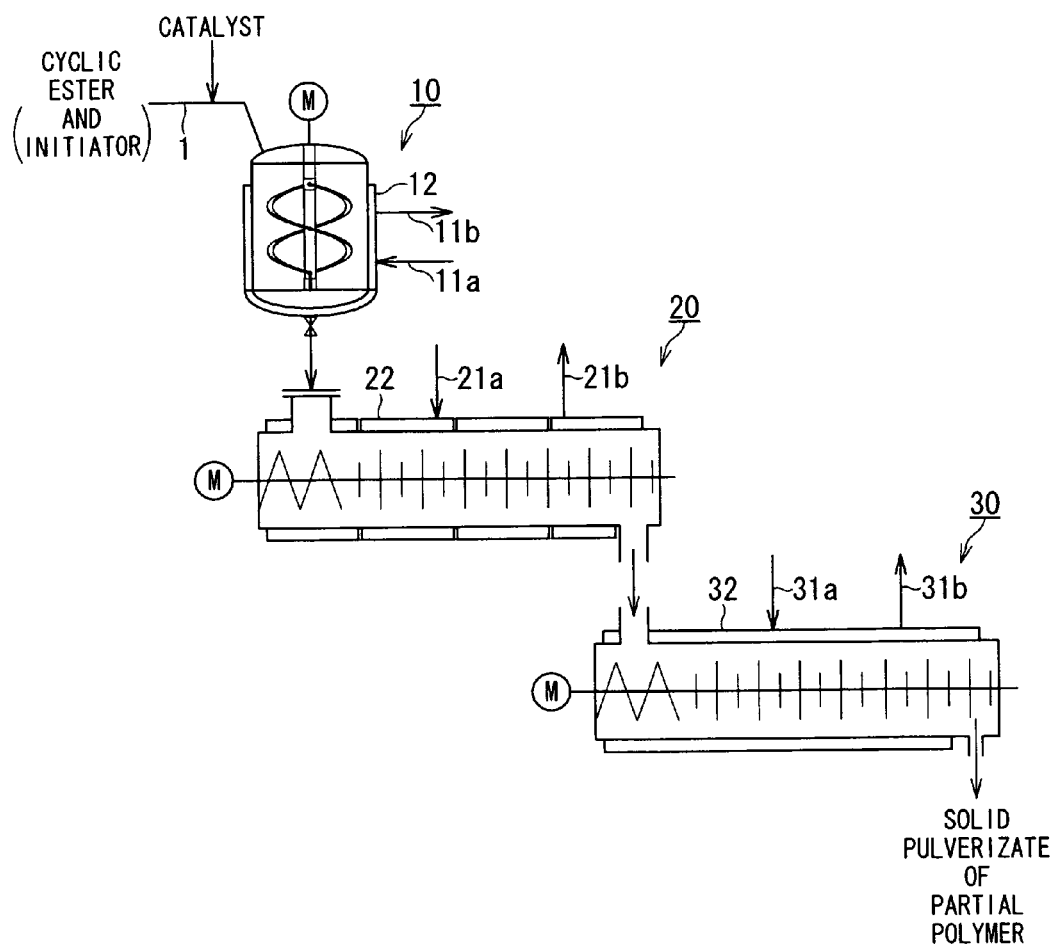
FIG. 1 is a schematic flow chart of an embodiment of continuous polymerization apparatus suitable for practicing the partial polymerization step in the process of the invention.

BEST MODE FOR PRACTICING THE INVENTION (Cyclic Ester)
Preferred cyclic esters used in the present invention may include cyclic diesters of α-hydroxycarboxylic acids and lactones. Examples of the α-hydroxycarboxylic acids providing the cyclic diesters may include: glycolic acid, L- and/or D-lactic acid, α-hydroxybutanoic acid, α-hydroxyisobutanoic acid, α-hydroxyvaleric acid, α-hydroxycaproic acid, α-hydroxy-isocaproic acid, α-hydroxyheptanoic acid, α-hydroxy-octanoic acid, α-hydroxydecanoic acid, α-hydroxymyristic acid, α-hydroxystearic acid, and alkyl-substituted products of these.

Examples of the lactones include β-propiolactone, β-butyrolactone, pivalolactone, γ-butyrolactone, δ-valerolactone, β-methyl-δ-valerolactone and ε-caprolactone. The cyclic etheresters may include dioxanone, for example.

A cyclic ester having an asymmetric carbon atom may be any of a D-isomer, an L-isomer and a racemic mixture of these. These cyclic esters may be used either singly or in any combination thereof. When two or more cyclic esters are used in combination, an arbitrary aliphatic copolyester can be obtained. The cyclic ester may be copolymerized with another comonomer. Examples of such another comonomer include cyclic monomers, such as trimethylene carbonate and 1,3-dioxolane.

Among the cyclic esters, glycolide, which is a cyclic diester of glycolic acid, L- and/or D-lactide, which is a cyclic diester of L- and/or D-lactic acid, and mixtures thereof are preferred, with glycolide being further preferred. Glycolide may be used alone. However, it may also be used in combination with another cyclic monomer to produce a polyglycolic acid copolymer (copolyester). When the polyglycolic acid copolymer is produced, it is desirable that a proportion of glycolide copolymerized is preferably at least 70% by weight, more preferably at least 80% by weight, particularly preferably at least 90% by weight from the viewpoint of physical properties of the copolyester formed, such as crystallinity and gas-barrier properties. As preferable examples of the cyclic monomer copolymerized with glycolide, lactide, c-caprolactone and trimethylene carbonate are raised.

No particular limitation is imposed on the production process of the cyclic ester. For example, glycolide can be obtained by a process comprising depolymerizing a glycolic acid oligomer. As the depolymerization process of the glycolic acid oligomer, there may be adopted, for example, a melt depolymerization process described in U.S. Pat. No. 2,668,162, a solid-phase depolymerization process described in JP-A 2000-119269, or a solution-phase depolymerization process described in JP-A 328481/1997 and WO 02/14303A1. Glycolide obtained as a cyclic condensate of a chloroacetic acid salt, which is reported in K. Chujo, et al., Die Makromolekulare Chemie, 100 (1967), 262-266, can also be used.

Among the depolymerization processes described above, the solution-phase depolymerization process is preferred for obtaining glycolide. According to the solution-phase depolymerization process, (1) a mixture containing a glycolic acid oligomer and at least one high-boiling polar organic solvent having a boiling point within a range of 230-450° C. is heated to a temperature, at which the depolymerization of the oligomer takes place, under ordinary pressure or under reduced pressure; (2) the oligomer is dissolved in the solvent until a residual rate (volume ratio) of a melt phase of the oligomer reaches 0.5 or lower, (3) the heating is further continued at the same temperature to depolymerize the oligomer, (4) a cyclic diester (i.e., glycolide) formed is distilled out together with the high-boiling polar organic solvent, and (5) glycolide is recovered from the distillate.

Examples of the high-boiling polar organic solvent may include aromatic carboxylic acid esters, such as bis(alkoxyalkyl) phthalates such as di (2-methoxyethyl) phthalate, alkylene glycol dibenzoates such as diethylene glycol dibenzoate, benzylbutyl phthalate, and dibutyl phthalate; aromatic phosphoric acid esters such as tricresyl phosphate; and polyalkylene glycol ethers such as polyethylene dialkyl ethers. The high-boiling polar organic solvent is generally used in an amount of 0.3 to 50 times the weight of the oligomer. Polypropylene glycol, polyethylene glycol, tetraethylene glycol or the like may be used as a solubilizing agent for the oligomer in combination with the high-boiling polar organic solvent, as needed. The depolymerization temperature of the glycolic acid oligomer is generally 230° C. or higher, preferably 230 to 320° C. Although the depolymerization is performed under atmospheric pressure or a reduced pressure, it is preferable to heat the oligomer under a reduced pressure of 0.1 to 90.0 kPa (1 to 900 mbar) to depolymerize it.

(Partial Polymerization)

A principal characteristic of the process of the present invention is that the above-mentioned cyclic ester is used as a starting material and a solid pulverizate of a partial polymer is obtained by using at least two stages of reaction apparatus. FIG. 1 is a schematic flow chart of an embodiment of continuous polymerization apparatus for practicing the partial polymerization in three stages.

Referring to FIG. 1, the partial polymerization apparatus in this embodiment includes first to third apparatus (reactors) 10, 20 and 30 each equipped with a temperature control segment, and the first apparatus 10 is fed with a cyclic ester monomer as mentioned above, an initiator, a molecular weight-control agent and a catalyst. The temperature control segments may be any type including: a jacket type using a heat transfer medium of a heat transfer oil, steam, warm water, cold water, etc.; a non-jacket type, such as electric heater, infrared heater, air-cooling fan, etc.; or a combination of these types.

As an initiator (molecular weight-control agent), it is possible to use water; a monohydric alcohol, such as butanol or dodecanol (lauryl alcohol), preferably a higher alcohol; or a polyhydric alcohol, such as butanediol, hexanediol or glycerin.

No particular limitation is imposed on the catalyst so far as it may be used as a ring-opening polymerization catalyst for respective cyclic esters. Specific examples of such catalysts include metallic compounds such as oxides, chlorides, carboxylates and alkoxides of tin (Sn), titanium (Ti), aluminum (Al), antimony (Sb), zirconium (Zr) and zinc (Zn). More specifically, preferable examples thereof include tin compounds such as tin halides (for example, tin dichloride, tin tetrachloride, etc.) and organic tin carboxylates (for example, tin octanoates such as tin 2-ethylhexanoate); titanium compounds such as alkoxytitanium; aluminum compounds such as alkoxyaluminum; zirconium compounds such as zirconium acetylacetone; and antimony halides. However, these are not exhaustive.

The amount of the catalyst used may be in a small amount relative to the cyclic ester and is generally at most 300 ppm, preferably 1-100 ppm, more preferably 10-60 ppm, based on the cyclic ester.

To the first reactor 10 of a stirring vessel-type, a cyclic ester monomer in a sufficiently dried state is directly fed by means of a dry feed device or in a molten state by heating to a temperature above the melting point thereof, generally at 85-150° C. The initiator can be directly fed to the reactor 10 in its solid state or liquid state but may preferably be added at the time of melting of the monomer so as to be uniformly dispersed in the monomer prior to the polymerization or can be fed to an intermediate point in a feed line 1 for feeding the monomer in a molten state. In order to further improve the dispersibility, it is also possible to equip the feed line with a mixing device such as a static mixer after the feed point. The catalyst can be directly fed in a solid state to the reactor 10 but may preferably be fed in a state of paste, melt or solution, further preferably in a solution state, so as to be uniformly dispersed in the monomer prior to polymerization. In order to prevent the remaining of a solvent in the resultant polymer, it is particularly preferred to dilute the catalyst at a concentration of at most 0.1 g/ml, more preferably at most 0.05 g/ml, further preferably 0.001-0.02 g/ml, by using a low-boiling solvent which is volatile at a polymerization temperature, inclusive of ethers such as diethyl ether, ketones such as acetone, and carboxylic acid esters such as ethyl acetate and feed the solution to an intermediate point in the feed line 1 for feeding the monomer supplied in a molten state. The above-mentioned concentration is not restrictive as far as it allows a quantitative feed. The feed catalyst solution should preferably be held in an atmosphere of inert gas, such as nitrogen. Generally, the initiator may be added to the monomer prior to the catalyst or may be added simultaneously with the catalyst on the monomer feed line.

In the first reactor 10, the polymerization temperature is controlled at 100-240° C., preferably 120-220° C., with a heat transfer medium fed to and discharged from a jacket 12 (which may be divided into two or more sections, as desired) through pipes 11a and 11b, so as to attain a conversion of preferably 5-50%, more preferably 5-40%, further preferably 15-40%, within a residence time of 1-30 min., preferably 3-15 min., set so as to provide the conversion. While it may be preferred to raise the conversion as high as possible in view of the progress of polymerization in the second stage or thereafter, an excessively high conversion is accompanied with increased discoloration of the partial polymer and an increased load of stirring in the first reactor, so that there is a restriction.

As the stirring device, it is possible to use a multi-stage paddle blade, a turbine blade or an anchor blade for a lower conversion, but for stirring of high-viscosity contents at a high conversion, it is preferred to use a helical ribbon blade, a helical screw blade or a vertical or horizontal twin-screw stirring device as disclosed in Patent Document 2.

Figure 2:
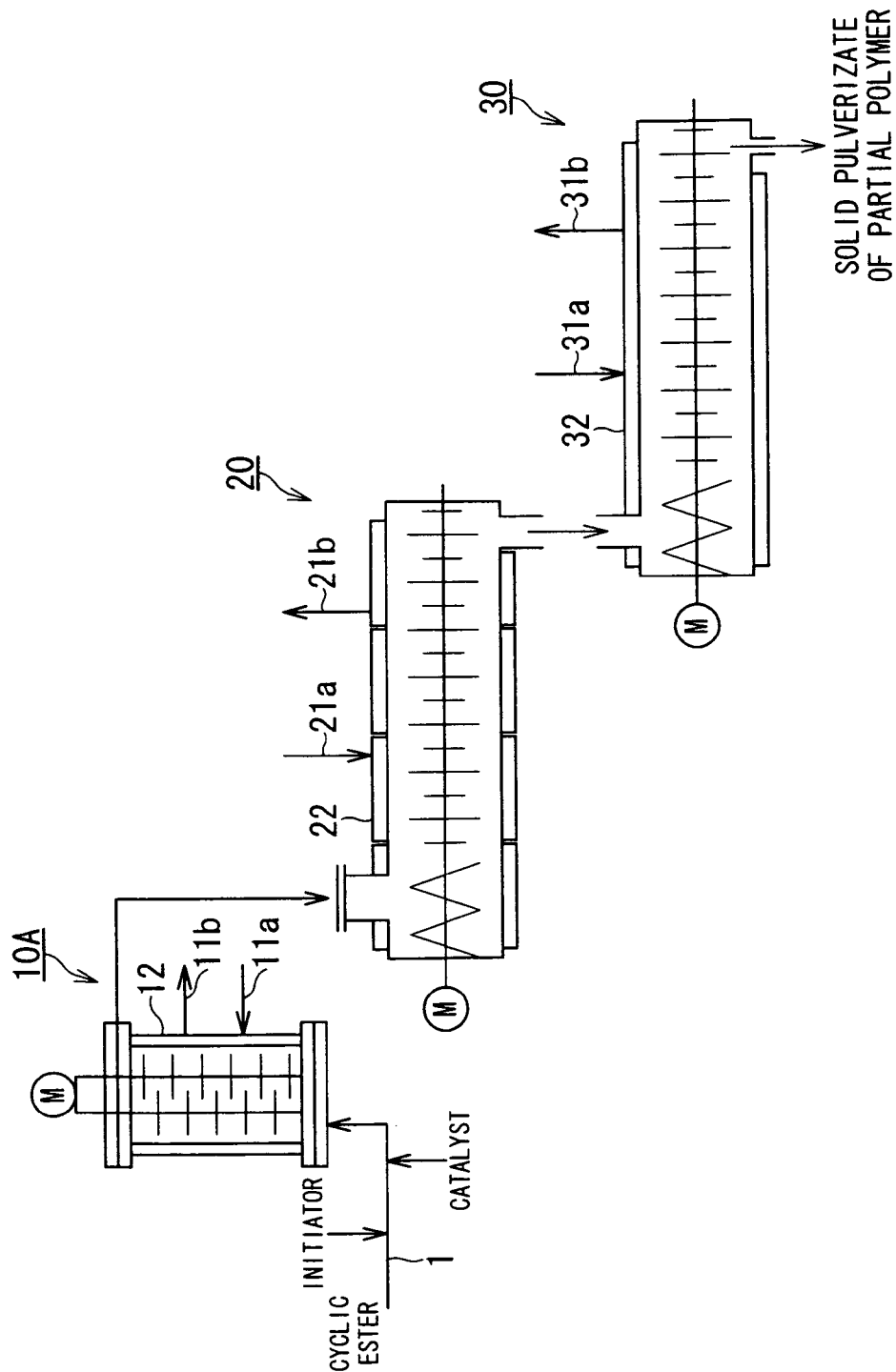
FIG. 2 is a schematic flow chart of another embodiment of continuous polymerization apparatus suitable for practicing the partial polymerization step in the process of the invention.

In place of a vertical stirring vessel 10 retaining an upper space therein as shown in FIG. 1, it is also possible to use a fully filled-type stirring vessel 10A (equipped with a twin-screw stirring device in this embodiment) for the purpose of preventing attachment onto the exposed wall, etc., of the vessel due to fluctuation of liquid level in the stirring vessel. (Incidentally, the apparatus system of FIG. 2 is only different in structure up to the first reactor 10A from that of FIG. 1 and the structure of the second reactor 20, etc., is similar to the one in the apparatus system of FIG. 1 even though the apparatus sizes can be different.)

To the second reactor 20, the partial polymer from the first reactor 10 (or 10A) is introduced in a molten state and controlled at a temperature of 120-240° C., preferably 140-220° C., with a heat transfer medium fed to and discharged out of a jacket 22 (which may be divided into two or more sections, as desired) so as to increase the polymerization conversion up to preferably 50-90%, more preferably 60-87%. In order to process such high-viscosity contents while providing a necessary residence time of, e.g., 5-20 min., a vertical or horizontal twin-screw stirring device is preferably used as the stirring device in the second reactor 20. The residence time can also be adjusted by an inclination of installation angle of the stirring device or a diameter of discharge port of the stirring device. The conversion at this stage may also be desirably as high as possible, but the increase in polymerization conversion may be restricted by the increased liability of discoloration of the resultant partial polymer.

To a third reactor or apparatus which is a twin-screw stirring device, the partial polymer from the second reactor 20 is introduced in a molten state, and in at least a later stage therein, the partial polymer is pulverized by utilizing a solid pulverization force of the twin-screw stirring device and continuously discharged in a pulverized state. For this purpose, the temperature of the partial polymer has to be lowered below the melting point of the resultant aliphatic polyester at the outlet of the third apparatus 30, and the temperature of a heat transfer medium fed to and discharged out of a jacket 32 (which may be divided into two or more sections, as desired) through pipes 31a and 31b may ordinarily be adjusted to be lower than the melting point. Depending on the conversion of the partial polymer, the melting point and crystallization temperature from its melting state thereof are changed. Generally, a higher conversion leads to higher melting point and crystallization temperature. As the temperature of the heat transfer medium approaches the melting point of the partial polymer, the partial polymer discharged out of the third reactor or apparatus is liable to be discharged in larger particles due to melt-sticking thereof. As the temperature of the heat transfer medium is excessively lower than the crystallization temperature of the partial polymer, the partial polymer discharged out of the third reactor or apparatus is liable to be an amorphous sticky state because of incomplete crystallization due to quenching. Accordingly, the temperature of the heat transfer medium in the third reactor or apparatus may be determined appropriately depending on the conversion of the partial polymer supplied thereto. More specifically, the principal functions of the third reactor or apparatus are solidification and pulverization of the partial polymer supplied thereto, and further polymerization of the partial polymer is a secondary function depending on the heat capacity of the partial polymer introduced from the second reactor, a heat capacity accompanying a phase change of solidification from the molten liquid and a residence time (e.g., 1-10 min.) allowed in the third apparatus. Accordingly, while it may depend on the conversion at the outlet of the second reactor, the conversion in the third apparatus is ordinarily at most 5%, particularly ca. 0-3%, and in order to suppress the discoloration of the solid partial polymer discharged, a final conversion is preferably 50-95%, particularly 60-90%. The twin-screw stirring device or apparatus 30 may comprise a reverse-directional or equi-directional twin-screw stirring device, but an equi-directional twin-screw stirring device exhibiting a better conveyability of the partial polymer is preferred, and a horizontal twin-screw stirring device is preferred for a similar reason. As the pulverizate, particles ranging from fine powder up to particle size exceeding 30 mm may be obtained, but in view of the processability, the average particle size thereof may preferably be on the order of 1-20 mm. As uniform a particle size as possible is preferred in order to attain a uniformity of polymerization degree in a subsequent solid-phase polymerization step.

Major advantages resulting from the continuous solidification and pulverization of partial polymer by means of a twin-screw stirring device according to the present invention are as follows. (a) As the solidification and pulverization are performed in a twin-screw stirring device in which a hermetic system of an inert gas such as nitrogen can be easily formed, the reactivity can be controlled while alleviating the loss of cyclic ester due to vaporization or sublimation. (b) It is possible to prevent the moisture absorption of the cyclic ester during the solidification and pulverization, so that it becomes possible to prevent the depolymerization and hydrolysis during the subsequent solid-phase polymerization step, thereby preventing the lowering in molecular weight of the product aliphatic polyester. (c) Different from the case wherein the partial polymer is pelletized through melt-kneading together with various stabilizers added thereto, inhibition of polymerization due to impurities is little in the subsequent solid-phase polymerization step. (d) As the partial polymer is continuously pulverized while being cooled and solidified (crystallized) in a twin-screw stirring device which exhibits conveyability and self-cleanability and allows easy hermetic sealing, the pulverized particle sizes are relatively uniformized, the pulverization load is small and contamination with iron powder, etc., can be prevented compared with the pulverization of lumps in ordinary batch-wise or continuous pulverization device. (e) After the subsequent solid-phase polymerization step, pelletization through melt-kneading together with a thermal stabilizer (and other optional additives) is performed, so that the polymer is obtained in a powdery particle state after solidification and pulverization, whereby a uniform melt-kneading effect is attained in the melt-kneading after powder blending with the thermal stabilizer compared with the case of blending of once-pelletized polymer and the thermal stabilizer or direct melt-kneading of a molten polymer with the thermal stabilizer. (f) Compared with the pelletization through the direct melt-kneading with the thermal stabilizer, the loss of cyclic ester due to vaporization or sublimation is decreased.

(Modification of the Partial Polymerization)

In the above, a preferred embodiment of the partial polymerization in the process of the present invention has been explained with reference to FIG. 1, but the partial polymerization can be modified within the scope of the present invention. For example, the partial polymerization is performed in 3 stages of reaction apparatus in the embodiment of FIG. 1, but it can be performed in 2 stages or 4 or more stages. In other words, the functions of the first reactor 10 and the second reactor 20 can be performed by a single reactor or 3 or more reactors. In the case of using a single reactor, it is preferred that the viscosity in the reactor is uniformly rendered relatively high by mixing the cyclic ester monomer with aliphatic polyester polymer or partial polymer, and anyway it is preferred to use a twin-screw stirring device suitable for treatment of a high-viscosity liquid. In the case of using 3 or more reactors, it is preferred to use a twin-screw stirring device for at least the final reactor.

Further, in the embodiment of FIG. 1, extruder- or kneader-type horizontal devices are shown as the twin-screw stirring devices 20 and 30, but it is also possible to use vertical twin-screw stirring devices as disclosed in Patent Document 2.

In any case, these at least two stages of reactors (10, 20, 30, etc.) for practicing the partial polymerization should preferably be rendered a hermetically closed system including the connection steps therebetween, and by forming such a hermetically closed system to prevent moisture absorption of the resultant partial polymer, the prevention of depolymerization or hydrolysis, etc., can be effectively accomplished in the subsequent solid-phase polymerization step.

(Solid-Phase Polymerization)

According to the present invention, the solid pulverizate of partial polymer obtained in the above-described manner is held at a temperature of at most the melting point thereof, preferably in a range of the melting point–100° C. to –20° C. for a prescribed time to accomplish a conversion of at least 98%, preferably 99-100%. As the device or apparatus therefor, it is possible to use any batchwise or continuous transfer-type device capable of retaining the partial polymer at a prescribed temperature for a prescribed time of, e.g., 0.5-10 hours, required for accomplishing the above conversion in an atmosphere of inert gas, such as nitrogen, for example, a reverse cone-type conduction heat transfer device, a drum-type device, a groove-type conduction heat transfer device, a fluidized bed drier, a pneumatic drier or a conveyer. In the case of using a continuous transfer-type device, it is also possible to form a reduced pressure atmosphere at a latter stage thereof, thereby further reducing the residual cyclic ester content in the product polymer.

(Pelletization)

According to the present invention, the polymer, i.e., aliphatic polyester, obtained in a pulverized state in the above-described manner, is melt-kneaded together with a thermal stabilizer to be palletized.

Preferred examples of the thermal stabilizer may include: phosphoric acid esters having a pentaerythritol skeleton, such as cyclic neopentane-tetra-il-bis(2,6-di-tert-butyl-4-methylphenyl) phosphite, cyclic neopentane-tetra-il-bis(2,4-di-tert-butylphenyl) phosphite, and cyclic neopentane-tetra-il-bis(octadecyl) phosphite, alkyl phosphates or alkyl phosphites having an alkyl group of preferably 8-24 carbon atoms mono- or di-stearyl acid phosphate or a mixture of these; metal carbonates, such as calcium carbonate and strontium carbonate, further, those generally known as polymerization catalyst deactivators, inclusive of hydrazine compounds having a —CONHNH—CO-unit, such as bis[2-(2-hydroxybenzoyl) hydrazine]dodecanoic acid and N,N'-bis[3-(3,5-di-t-butyl-4-hydroxyphenyl) propionyl]hydrazine; triazole compounds, such as 3-(N-salicyloyl) amino-1,2,4-triazole; and further triazine compounds. The structures of these thermal stabilizers are disclosed in WO2003/037956A1, if necessary. These thermal stabilizers may preferably be used in a proportion of at most 3 wt. parts, more preferably 0.003-1 wt. part, most preferably 0.01-0.05 wt. part, per 100 wt. parts of aliphatic polyester.

Further, by adding a carboxyl group-capping agent in addition to the thermal stabilizer, it is possible to improve the moisture resistance (resistance to hydrolysis) of the product aliphatic polyester.

As the carboxyl group-capping agent, it is possible to use compounds generally known as moisture resistance-improving agents for aliphatic polyesters such as polylactic acid. Examples thereof may include: carbodiimide compounds inclusive of monocarbodiimides and polycarbodiimides, such as N,N-2,6-diisopropulphenylcarbodiimides; oxazoline compounds, such as 2,2'-m-phenylene-bis(2-oxazoline), 2,2'-p-phenylenebis (2-oxazoline), 2,2-phenyl-2 oxazoline and styrene-isopropenyl-2-oxazoline; oxazine compounds, such as 2-methoxy-5,6-dihydro-4H-1,3-oxazine, and epoxy compounds, such as N-glycidyldiphthalimide, cyclohexene oxide and triglycidyl isocyanurate. Among these, carbodiimide compounds and epoxy compounds are preferred. These carboxyl group-capping agents can be used in combination of two or more species, as desired, and may preferably be used in a proportion of 0.01-10 wt. parts, more preferably 0.1-2 wt. parts, particularly 0.2-1 wt. part, per 100 wt. parts of the aliphatic polyester.

In the process of the present invention, the above-mentioned pulverizate of aliphatic polyester and the thermal stabilizer, and the optionally added carboxyl group-capping agent are melted (and mixed) by heating in a temperature range of the melting point of aliphatic polyester+5° C. to the melting point+60° C.; and preferably in a temperature range of 230-280° C., more preferably 240-270° C., e.g., in the case where the aliphatic polyester is polyglycolic acid (PGA). The melting (and mixing) means may basically be arbitrary, inclusive of a stirrer, a continuous kneader, etc., but the melting (and mixing) may preferably be performed in an extruder (e.g., an equi-directionally rotating twin-screw extruder) allowing a short-time processing and a smooth transition to a subsequent cooling step. In the case of PGA for example, the addition effects of a thermal stabilizer and a carboxyl group-capping agent are liable to be insufficient at a heat-melting temperature below 230° C. In excess of 280° C., on the other hand, the PGA resin composition is liable to be discolored. In the case of using an extruder and adding a carboxyl group-capping agent in addition to the thermal stabilizer, the addition effects of the additives can be maximized by feeding the thermal stabilizer together with the aliphatic polyester from a hopper at the extruder inlet and feeding the carboxyl group-capping agent from an intermediate stage of the extruder. Further, it is also possible to impart a reduced pressure, as desired, to the melt at a middle or later stage of the extruder, thereby further reducing the residual cyclic ester.

It is possible to use a filler in order to impart a mechanical strength and other properties to the aliphatic polyester. The filler is not particularly limited in species but may be in the form of fiber, plates, powder or particles. Specific examples thereof may include: fiber or whisker form fillers, such as glass fiber, PAN-based and pitch-based carbon fiber metal fiber, such as stainless steel fiber, aluminum fiber and brass fiber, natural fiber of chitin, chitosan, cellulose, cotton, etc., organic synthetic fiber such as aromatic polyamide fiber, gypsum fiber, ceramic fiber, asbestos fiber, zirconia fiber, alumina fiber, silica fiber, titanium oxide fiber, silicon carbide fiber, rock wool, potassium titanate whisker, barium titanate whisker, aluminum borate whisker, and silicon nitride whisker; and powdery, particulate and plate-like fillers of natural inorganic minerals, such as mica, talc, kaolin, silica and sand, calcium carbonate, glass beads, glass flake, glass micro-balloon, clay, molybdenum disulfide, wallastenite, montmorillonite, titanium oxide, zinc oxide, calcium polyphosphate and graphite. Any type of glass fiber can be used without particular restriction as far as it is generally usable for reinforcement of resins, and can be selected from chopped strands of long fiber type and short fiber type, and milled fiber. The above-mentioned fillers can be used in two or more species in combination. Incidentally, these fillers can be used after surface treatment thereof with known coupling agents, such as silane coupling agents and titanate coupling agents, and other surface treating agents. Further, the glass fiber can be coated or bundled with a thermoplastic resin, such as ethylene/vinyl acetate copolymer, or a thermosetting resin such as epoxy resin. The filler may be added in 0.1-100 wt. parts, preferably 1-50 wt. parts, per 100 wt. parts of the PGA resin.

EXAMPLES

Hereinbelow, the present invention will be described more specifically based on Examples of producing PGA as an aliphatic polyester. The physical properties (or values) described in the present specification including the following description are based on those measured according to the following methods.

(1) Conversion

A glycolide content in a reaction mixture was measured to calculate a conversion of the glycolide. For measurement of the glycolide content, ca. 100 mg of a sample was dissolved in 2 ml of dimethyl sulfoxide (special grade, made by Kanto Kagaku K.K.) to which 4-chlorobenzophenone (made by Kanto Kagaku K.K.) was added at a concentration of 0.2 g/l as an internal standard, by heating at 150° C. for ca. 5 min., followed by cooling to room temperature and filtration. The measurement was performed by injecting 1 μl of the filtrate to a gas chromatography (GC) apparatus.

<GC Conditions>
Apparatus: "GC-2010" (made by K.K. Shimadzu Seisakusho).
Column: "TC-17" (0.25 mm in diameter×30 m in length)
Column temperature: Held at 150° C. for 5 min., heated to 270° C. at a rate of 20° C./min. and held at 270° C. for 3 min.
Injection temperature: 180° C.
Detector: FID (hydrogen flame ionization detector) at a temperature of 300° C.

(2) Melting Point 10 mg of a sample was taken on an aluminum-made pan, and after sealing, a melting point (Tm) was measured by a differential scanning calorimeter (DSC) under a stream of nitrogen (10 ml/min.) as a peaktop temperature of a heat-absorption peak due to the melting.

<DSC Conditions>
Apparatus: "TC10A", made by Mettler Instrumente A.G.
Measurement conditions: Temperature range: 0-280° C.
Temperature raising rate: 20° C./min.

(3) Molecular Weight

Ca. 10 mg of a sample was dissolved in 0.5 ml of dimethyl sulfoxide (special grade, made by Kanto Kagaku K.K.) at 150° C., immediately followed by quenching with cold water. Further, the sample solution was messed up to 10 ml with hexafluoroisopropanol (HFIP, made by Dupont) containing sodium trifluoroacetate (made by Kanto Kagaku K.K.) dissolved therein at 5 mM. Then, the resultant sample solution was filtrated through a 0.1 μm-membrane filter made of polytetrafluoroethylene and then injected into a gel permeation chromatography (GPC) apparatus for measurement of molecular weight under the following conditions. Incidentally, the sample was injected into the GPC apparatus within 30 minute after the dissolution. Based on the measured molecular weight distribution were determined a weight-average molecular weight, a number-average molecular weight and further a polydiperse factor (=weight-average molecular weight/number-average molecular weight).

<GPC Conditions>
Apparatus: "Shodex-104" made by Showa Denko K.K.
Column: Two columns of "HFIP-606M" were connected in series with 1 column of "HFIP-G" as a pre-column.
Column temperature: 40° C.
Elution liquid: HFIP solution containing sodium trifluoroacetate dissolved at 5 mM.
Flow rate: 0.6 ml/min.
Detector: RI (differential refractive index) detector.
Molecular weight calibration: Effected by using standard polymethyl methacrylate having different molecular weights (of 1,950,000, 659,000, 218,000, 50,000, 21,000, 7,000 and 2,000, made by Showa Denko K.K.).

(4) Yellowness Index (YI)

Measured by using a colorimeter with respect to a sample spread in layers on an accessory Petri dish.

<Colorimeter Conditions>
Apparatus: "Color Analyzer TC-1800MKII", made by Tokyo Denshoku, Co., Ltd.
Measurement conditions: Measured as a reflected light from Standard light C at a view angle of 2 degrees. Determined as an average of 3 measured values.

Example 1

Partial ring-opening polymerization of glycolide was performed by means of an apparatus system schematically shown in FIG. 1. More specifically, into a helical blade stirring vessel-type reactor (10) retaining nitrogen gas atmosphere and with a jacket temperature (TjI) set to 200° C., there were continuously charged a molten liquid of polymerization starting mixture comprising glycolide and 1-dodecanol at 0.2 mol % with respect to the glycolide at a rate of 3 kg/h and an ethyl acetate solution of tin dichloride as a catalyst (0.0015 g/ml) at rate of 1 ml/min. so as to be 30 ppm with respect to the glycolide.

Under continuation of the stirring, the polymerization starting mixture was continually charged, and at an average residence time of 5 min. in the reactor 10, the melt of reaction mixture at an internal temperature (TrI) of 180° C. was withdrawn from the reactor outlet at a rate of 3 kg/h and continuously charged to an equi-directionally rotating horizontal twin-screw reactor (20; a continuous kneader-reactor, made by K.K. Kurimoto Tekkosho) equipped with a jacket 22 divided into two zones (each provided with one pair of inlet 21a and outlet 21b for heating oil) set to jacket temperatures (TjII) of 190° C. and 210° C., respectively.

Under continuation of the stirring, the polymerization mixture was continually charged, and at an average residence time of 10 min. in the reactor 20, the melt of the reaction mixture at an internal temperature, (TrII) of 212° C. was withdrawn from the reactor outlet at a rate of 3 kg/h and continuously charged to an equi-directionally rotating horizontal twin-screw reactor (30; a continuous kneader-reactor, made by K.K. Kurimoto Tekkosho) set to a jacket temperature (TjIII) of 140° C.

Under continuation of the stirring, the polymerization mixture was continually charged, and at an average residence time of 3 min. in the reactor 30, the reaction mixture in a particulate state was withdrawn from the reactor outlet at a rate of 3 kg/h.

After reaching a steady state, the polymerization reaction comprising the above-mentioned three stages was continuously operated for 24 hours.

For the first reactor 10, the reaction mixture after lapse of 2 hours exhibited a polymerization conversion of 15%, a melting point (TmI) of 158° C., a weight-average molecular weight of $9 \times 10^4$, a polydisperse factor of 1.4 and a yellowness index (YI) of 3, and the reaction mixture after lapse of 24 hours exhibited a polymerization conversion of 14%, a melting point (TmI) of 157° C., a weight-average molecular weight of $9 \times 10^4$, a polydisperse factor of 1.4 and a yellowness index (YI) of 3.

For the second reactor 20, the reaction mixture after lapse of 2 hours exhibited a polymerization conversion of 70%, a melting point (TmII) of 202° C., a weight-average molecular weight of $18 \times 10^4$, a polydisperse factor of 1.8 and a yellowness index (YI) of 12, and the reaction mixture after lapse of 24 hours exhibited a polymerization conversion of 71%, a melting point (TmII) of 202° C., a weight-average molecular weight of $18 \times 10^4$, a polydisperse factor of 1.8 and a yellowness index (YI) of 12. After the 24 hours of continuous operation, the barrel of the reactor was dismembered to recover a polymerizate sample at an intermediate point of the two-zoned jacket corresponding to a mid point between the feed port and the discharge port. The polymerizate sample showed a melting point of 179° C.

For the third reactor 30, the reaction mixture after lapse of 2 hours was rich in particles of ca. 3.2 mm in diameter and exhibited a polymerization conversion of 72%, a melting point (TmIII) of 203° C., a weight-average molecular weight of $18 \times 10^4$, a polydisperse factor of 1.8 and a yellowness index (YI) of 13, and the reaction mixture after lapse of 24 hours was rich in particles of ca. 3.0 mm in diameter and exhibited a polymerization conversion of 74%, a melting point (TmIII) of 204° C., a weight-average molecular weight of $18 \times 10^4$, a polydisperse factor of 1.8 and a yellowness index (YI) of 13.

10 kg of the PGA partial polymerizate obtained in the above-described manner was charged in a 20 L-pressure-resistant autoclave capable of internal temperature control while keeping a nitrogen atmosphere and continually heated for 3 hours at an internal temperature of 170° C. to effect solid-phase polymerization, whereby the polymerization conversion reached 99% or above. The thus-obtained PGA exhibited a melting point of 222° C., a weight-average molecular weight of $20 \times 10^4$, a polydisperse factor of 2.0 and a yellowness index (YI) of 15.

To 10 kg of particulate PGA with somewhat reduced angles after the solid-phase polymerization step were added 3 g of a substantially equi-molar mixture of mono- and di-stearyl acid phosphate (as a thermal stabilizer) (trade name: "ADEKASTAB AX-71", made by Asahi Denka Kogyo K.K.) and 50 g of N,N-2,6-diisopropylphenylcarbodiimide (as a carboxyl group-capping agent) (made by Kawaguchi Kagaku Kogyo K.K.) to obtain a blend, which was fed from an inlet hopper at a rate of 2 kg/h to a twin-screw kneading extruder ("LT-20", made by K.K. Toyo Seiki Seisakusho) with cylinder temperatures set to 220-240° C., to palletize the PGA composition. The resultant PGA pellets exhibited a longer-axis length-average diameter of 2.9 mm, a residual glycolide content of 0.2%, a melting point of 222° C., a weight average molecular weight of $20 \times 10^4$, a polydisperse factor of 2.0 and a yellowness index of 15.

Example 2

Partial ring-opening polymerization of glycolide was performed by means of an apparatus system schematically shown in FIG. 2. More specifically, from a lower part of a liquid-filled stirring vessel-type reactor (10A) equipped with biaxial multi-stage paddle blades rotating in identical directions, retaining a nitrogen atmosphere and set to a jacket temperature (TjI) of 200° C., there were respectively continuously charged glycolide at a rate of 30 kg/h, 1-dodecanol (as an initiator) at a rate of 0.3 mol % of the glycolide and a 0.015 g/ml-solution in ethyl acetate of tin dichloride (as a catalyst) at a rate of 1 ml/min so as to be 30 ppm of the glycolide, through a glycolide feed pipe 1.

Under continuation of the stirring, the polymerization starting mixture was continually charged, and at an average residence time of 5 min, in the reactor 10, the melt of reaction mixture at an internal temperature (TrI) of 180° C. was withdrawn from the reactor outlet at a rate of 30 kg/h and continuously charged to an equi-directionally rotating horizontal twin-screw reactor (20; a continuous kneader-reactor, made by K.K. Kurimoto Tekkosho) retaining a nitrogen atmosphere and equipped with a jacket 22 longitudinally divided into four zones (each provided with one pair of inlet 21a and outlet 21b for heating oil) set to jacket temperatures (TjII) of 200° C., 210° C., 210° C. and 210° C., respectively.

Under continuation of the stirring, the polymerization mixture was continually charged, and at an average residence time of 12 min. in the reactor 20, the melt of the reaction mixture at an internal temperature (TrII) of 215° C. was withdrawn from the reactor outlet at a rate of 30 kg/h and continuously charged to an equi-directionally rotating horizontal twin-screw reactor (30; a continuous kneader-reactor, made by K.K. Kurimoto Tekkosho) set to a jacket temperature (TjIII) of 80° C.

Under continuation of the stirring, the polymerization mixture was continually charged, and at an average residence time of 2 min. in the reactor 30, the reaction mixture in a particulate state was withdrawn from the reactor outlet at a rate of 30 kg/h.

After reaching a steady state, the polymerization reaction comprising the above-mentioned three stages was continuously operated for 5 hours.

For the first reactor 10A, the reaction mixture after lapse of 2 hours exhibited a polymerization conversion of 28%, a melting point (TmI) of 172° C., a weight-average molecular weight of $8\times10^4$, a polydisperse factor of 1.4 and a yellowness index (YI) of 3, and the reaction mixture after lapse of 5 hours exhibited a polymerization conversion of 29%, a melting point (TmI) of 173° C., a weight-average molecular weight of $8\times10^4$, a polydisperse factor of 1.4 and a yellowness index (YI) of 3.

For the second reactor 20, the reaction mixture after lapse of 2 hours exhibited a polymerization conversion of 71%, a melting point (TmII) of 202° C., a weight-average molecular weight of $15\times10^4$, a polydisperse factor of 1.7 and a yellowness index (YI) of 10, and the reaction mixture after lapse of 5 hours exhibited a polymerization conversion of 72%, a melting point (TmII) of 203° C., a weight-average molecular weight of $15\times10^4$, a polydisperse factor of 1.7 and a yellowness index (YI) of 11.

For the third reactor 30, the reaction mixture after lapse of 2 hours was rich in particles of ca. 3 mm in diameter and exhibited a polymerization conversion of 72%, a melting point (TmIII) of 202° C., a weight-average molecular weight of $15\times10^4$, a polydisperse factor of 1.7 and a yellowness index (YI) of 10, and the reaction mixture after lapse of 5 hours exhibited a polymerization conversion of 73%, a melting point (TmIII) of 204° C., a weight-average molecular weight of $15\times10^4$, a polydisperse factor of 1.8 and a yellowness index (YI) of 11.

120 kg of the PGA partial polymerizate obtained in the above-described manner was charged in a groove-type conduction heat-transfer device capable of internal temperature control while keeping a nitrogen atmosphere. Heating was continued 3 hours at an internal temperature of 170° C. to effect solid-phase polymerization, whereby the polymerization conversion reached 99% or above. The thus-obtained PGA exhibited a melting point of 222° C., a weight-average molecular weight of $19\times10^4$, a polydisperse factor of 2.0 and a yellowness index (YI) of 16.

To 120 kg of particulate PGA with somewhat reduced angles after the solid-phase polymerization step were added 36 g of a substantially equi-molar mixture of mono- and di-stearyl acid phosphate (as a thermal stabilizer) (trade name: "ADEKASTAB AX-71", made by Asahi Denka Kogyo K.K.) and 600 g of N,N-2,6-diisopropylphenylcarbodiimide (as a carboxyl group-capping agent) (made by Kawaguchi Kagaku Kogyo K.K.) to obtain a blend, which was fed from an inlet hopper at a rate of 80 kg/h to a twin-screw kneading extruder ("TEM41SS", made by Toshiba Kikai K.K.) with cylinder temperatures set to 200-250° C., to palletize the PGA composition. The resultant PGA pellets exhibited a longer-axis length-average diameter of 3 mm, a residual glycolide content of 0.2%, a melting point of 222° C., a weight average molecular weight of $20\times10^4$, a polydisperse factor of 2.0 and a yellowness index of 18.

INDUSTRIAL APPLICABILITY

As described above, according to the present invention, it is possible to efficiently produce an aliphatic polyester of a high molecular weight and with little discoloration.

The invention claimed is:

1. A process for producing an aliphatic polyester, comprising:
   Step 1: performing ring-opening polymerization of a cyclic ester to produce a partial polymer in a molten state of the aliphatic polyester,
   Step 2: continuously introducing the partial polymer in the molten state into a twin-screw stirring device to continuously obtain a partial polymer in a solid powdery particle state, at a conversion of 50-95%,
   Step 3: subjecting the partial polymer in the solid powdery particle state to solid-phase polymerization in an atmosphere of inert gas to obtain a solid polymer, and
   Step 4: melt-kneading the solid polymer after solid-phase polymerization together with a thermal stabilizer to form pellets of the aliphatic polyester, wherein the twin-screw stirring device is set at a temperature below a melting point of the partial polymer in the molten state, and contains an inert gas atmosphere.

2. The production process according to claim 1, wherein the partial polymer in a molten state is obtained through ring-opening polymerization of a cyclic ester in at least two stages of series reactors.

3. The production process according to claim 2, wherein the partial polymer in a molten state is obtained through two stages of series reactors, wherein a conversion in a first stage reactor is 5-50%, and a conversion after a second stage is 50-90%.

4. The production process according to claim 2, wherein the two stages of series reactors comprise a combination of a stirring vessel reactor and a twin-screw stirring reactor.

5. The production process according to claim 2, wherein each of the two stages of series reactors comprises a twin-screw stirring reactor.

6. The production process according to claim 4, wherein the twin-screw stirring reactor in a latter stage is equipped with at least two stages of temperature control segments capable of independent temperature control.

7. The production process according to claim 5, wherein the twin-screw stirring reactor in a latter stage is equipped with at least two stages of temperature control segments capable of independent temperature control.

8. The production process according to claim 1, wherein the twin-screw stirring device is equipped with at least two stages of temperature control segments capable of independent temperature control.

9. The production process according to claim 1, wherein in Step 4, a carboxyl group-capping agent is added and melt-kneaded together with the aliphatic polyester and the thermal stabilizer.

10. The production process according to claim 1, wherein the aliphatic polyester comprises polyglycolic acid.

* * * * *